US009467795B2

(12) United States Patent
Kreitzer et al.

(10) Patent No.: US 9,467,795 B2
(45) Date of Patent: Oct. 11, 2016

(54) METHOD AND APPARATUS FOR APPLICATION OPTIMIZATION AND COLLABORATION OF WEARABLE DEVICES

(71) Applicant: MOTOROLA SOLUTIONS, INC, Schaumburg, IL (US)

(72) Inventors: Stuart S Kreitzer, Coral Springs, FL (US); Jesus F Corretjer, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/483,835

(22) Filed: Sep. 11, 2014

(65) Prior Publication Data
US 2016/0080888 A1    Mar. 17, 2016

(51) Int. Cl.
| | |
|---|---|
| H04B 7/26 | (2006.01) |
| H04W 4/00 | (2009.01) |
| H04B 1/3827 | (2015.01) |
| G06F 3/01 | (2006.01) |
| H04W 84/12 | (2009.01) |

(52) U.S. Cl.
CPC .............. *H04W 4/001* (2013.01); *G06F 3/017* (2013.01); *H04B 1/385* (2013.01); *H04B 7/26* (2013.01); *H04W 84/12* (2013.01)

(58) Field of Classification Search
USPC ....................................................... 455/575.6
See application file for complete search history.

(56) References Cited

U.S. PATENT DOCUMENTS

| | | | |
|---|---|---|---|
| 6,842,877 B2* | 1/2005 | Robarts | G06F 1/163 |
| | | | 700/65 |
| 8,484,636 B2 | 7/2013 | Mehta et al. | |
| 8,793,522 B2 | 7/2014 | Rahman et al. | |
| 2008/0077620 A1* | 3/2008 | Gilley | G06F 19/3406 |
| 2010/0250337 A1 | 9/2010 | Kassaei | |

(Continued)

FOREIGN PATENT DOCUMENTS

WO    2014029089 A1    2/2014

OTHER PUBLICATIONS

International Search Report and Written Opinion for corresponding International Patent Application No. PCT/US2015/044829, mailed on Nov. 3, 2015.

*Primary Examiner* — Edward Urban
*Assistant Examiner* — Ralph H Justus
(74) *Attorney, Agent, or Firm* — Daniel R. Bestor

(57) ABSTRACT

A method and apparatus associated with one or more wearable devices for a user includes utilizing the one or more wearable devices, for a set of functionality, in a first configuration by the user, wherein the user is in a specific role; communicating data, in a Personal Area Network (PAN), between the one or more wearable devices and between a mobile device associated with the user; and providing information to a recommendation engine, wherein the information is related to the specific role, the set of functionality, and the first configuration.

21 Claims, 8 Drawing Sheets

(56) References Cited

U.S. PATENT DOCUMENTS

| | | |
|---|---|---|
| 2010/0315549 A1 | 12/2010 | Basso et al. |
| 2012/0023212 A1 | 1/2012 | Roth et al. |
| 2013/0198694 A1* | 8/2013 | Rahman ............... G06F 3/0484 715/864 |
| 2013/0244714 A1 | 9/2013 | Klein et al. |
| 2013/0271350 A1 | 10/2013 | Lyons |
| 2014/0039840 A1* | 2/2014 | Yuen ................ A61B 5/6838 702/189 |
| 2014/0120953 A1 | 5/2014 | Ingram et al. |
| 2014/0282178 A1* | 9/2014 | Borzello ............. G06F 9/4446 715/771 |
| 2014/0350883 A1* | 11/2014 | Carter ................ A61B 5/6802 702/141 |
| 2014/0370879 A1* | 12/2014 | Redding ............... H04W 4/001 455/419 |
| 2015/0035643 A1* | 2/2015 | Kursun ............. G07C 9/00158 340/5.52 |
| 2015/0039880 A1* | 2/2015 | Aminzade ........... H04L 41/0816 713/100 |
| 2015/0281945 A1* | 10/2015 | Seo ...................... H04M 1/271 455/419 |
| 2015/0289217 A1* | 10/2015 | Ban .................... H04W 56/001 455/41.2 |
| 2015/0323981 A1* | 11/2015 | Yarvis ................. G06F 1/3293 713/323 |

* cited by examiner

METHOD AND APPARATUS FOR APPLICATION OPTIMIZATION AND COLLABORATION OF WEARABLE DEVICES

BACKGROUND OF THE INVENTION

The present disclosure relates to smart, wearable devices. There is a rapidly growing market for wearable, computer-enabled devices which are referred to herein as wearable devices, smart devices, wearables, etc. Examples of wearable devices include, without limitation, health tracking bands or bands, smart watches, smart phones, computerized eye glasses, smart gloves, head-mounted displays, activity trackers, and the like. It is also increasingly common for several wearable devices to be worn simultaneously because each device has intrinsic strengths and weaknesses. For example, a smart watch may be preferred for time/date and message notifications; an exercise band for tracking heart rate, steps, and calories; and smart glasses as a multifunction information display and computer.

Users wearing multiple smart devices together expect the devices to be connected and to work together synergistically to deliver unique and actionable information without duplication. However, because smart devices may provide similar capabilities, there is the potential for redundant, overlapping functionality. For example, a smart watch and smart glasses could both display the time, location, or the user's next calendar appointment. Furthermore, it would be desirable that adding or removing wearable devices would automatically reconfigure the devices so that functionality is not lost, if possible, when a device is removed or duplicated when a new wearable is added. Users also expect wearable devices to be responsive to traditional jewelry such as non-smart watches and adapt.

Accordingly, there is a need for a method and apparatus for application optimization and collaboration of wearable devices that configures applications and application settings on a system of wearable devices to optimize functionality and minimize redundancy.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
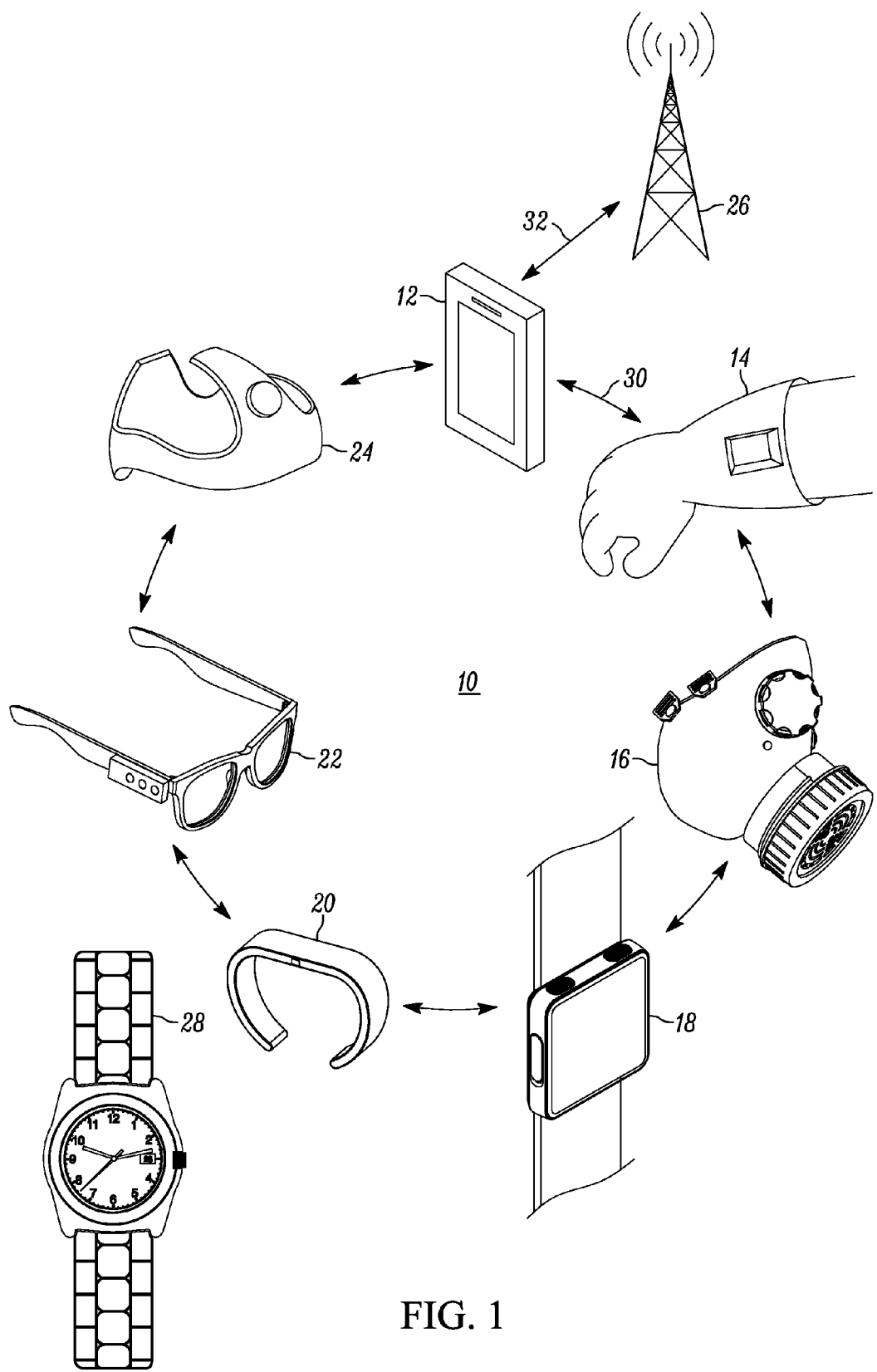
FIG. 1 is a diagram of a wearable system with a mobile device and exemplary wearable devices in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method associated with one or more wearable devices for a user includes utilizing the one or more wearable devices, for a set of functionality, in a first configuration by the user, wherein the user is in a specific role; communicating data, in a Personal Area Network (PAN), between the one or more wearable devices and between a mobile device associated with the user; and providing information to a recommendation engine, wherein the information is related to the specific role, the set of functionality, a set of applications, and the first configuration. The mobile device can include, without limitation, a smart phone, tablet, laptop, radio, and the like, with connectivity to a wide area gateway. The configuration can include device settings, which types of wearable devices are used, and application information, such as which applications are installed, application functionality, application usage information, and user customizable settings in the applications.

In another exemplary embodiment, a cloud-based server operating as a recommendation engine associated with wearable devices for a user includes a network interface communicatively coupled to a network; a processor communicatively coupled to the network interface; and memory storing instructions that, when executed, cause the processor to receive configuration information and application information associated with wearable devices for each of the plurality of users, store the configuration information and application information associated with wearable devices based on roles of the plurality of users, and determine an optimal configuration based on the stored configuration information and application information for each of the roles.

In a further exemplary embodiment, a mobile device communicatively coupled to one or more wearable devices associated with a user includes a Personal Area Network (PAN) wireless interface communicatively coupled to the one or more wearable devices; a processor communicatively coupled to the PAN wireless interface; and memory storing instructions that, when executed, cause the processor to form the PAN with the one or more wearable devices; operate an application acting as a recommendation engine; and process data associated with the one or more wearable devices with the recommendation engine.

In a further exemplary embodiment, a mobile device communicatively coupled to one or more wearable devices associated with a user, includes a Wide Area Network (WAN) and/or a Wireless Local Area Network (WLAN) wireless interface communicatively coupled to a network; a Personal Area Network (PAN) wireless interface communicatively coupled to the one or more wearable devices; a processor communicatively coupled to the PAN wireless interface; and memory storing instructions that, when executed, cause the processor to form the PAN with the one or more wearable devices; operate an application communicatively coupled to a recommendation engine via the network; and communicate data associated with the one or more wearable devices with the recommendation engine.

In various exemplary embodiments, a method and apparatus for application optimization and collaboration of wearable devices are described that configures applications on a system of wearable devices to optimize functionality and minimize redundancy. In one exemplary aspect, the method and apparatus recommends optimal applications and configurations of smart, wearable devices worn together on a user. In another exemplary embodiment, the method and apparatus provide dynamic reconfiguration, when possible, of functionality responsive to addition or removal of wearable devices. Variously, the wearable devices can be configured in a Personal Area Network (PAN) or the like wirelessly along with an optional connection to a cloud-based analysis server.

Exemplary Wearable System

FIG. 1 is a diagram of a wearable system 10 with a mobile device 12 and exemplary wearable devices 14-24. The exemplary wearable devices 14-24 are examples of various different wearable devices a user can wear; other wearable devices are also contemplated. The mobile device 12 can be a smart phone, tablet, Personal Digital Assistant (PDA), etc. The mobile device 12 may include various wireless interfaces, such as a Wide Area Network (WAN) interfaces to a base station 26 (e.g. Long Term Evolution (LTE) to Evolved Node Bs (eNBs)), PAN interfaces (e.g., Bluetooth, Bluetooth Low Energy (BLE), iBeacon, ZigBee, wireless USB, etc.), and Wireless Local Area Network (WLAN) interfaces (e.g., Wi-Fi (IEEE 802.11 and variants thereof, etc.).

The wearable devices 14-24 can include, a smart glove 14, a smart mask 16, a smart watch 18, a smart band 20, smart glasses 22, a smart head-mounted computer 24, and the like. These wearable devices 14-24 are presented as examples of wearable devices which can be used with the method and apparatus; other wearable devices are also contemplated. The following provides exemplary functionality of the wearable devices 14-24. Note, all of the wearable devices 14-24 can include circuitry, sensors, and wireless interfaces to perform a set of functionality.

The smart glove 14 can be configured to monitor hand movements, measure vital statistics (e.g., pulse, blood pressure, temperature, oxygen levels, etc.), track activity, detect hand gestures for control of other devices, and the like. The smart mask 16 can attach to a Self Contain Breathing Apparatus (SCBA) or to a helmet, visor, etc. The smart mask 16 can monitor vital statistics (e.g., breathing, temperature, oxygen levels, etc.) and provide a remote microphone, display, etc. The smart watch 18 can replace a conventional watch 28 and can include a display with a touch screen for various functions such as interacting with the mobile device 12. The smart watch 18 can also monitor vital statistics (e.g., pulse, blood pressure, temperature, oxygen levels, etc.) as well as track activity (e.g., pedometer, location, etc.). The smart band 20 can be worn similar to the smart watch 18 and can monitor vital statistics (e.g., pulse, blood pressure, temperature, oxygen levels, etc.) as well as track activity (e.g., pedometer, location, etc.).

The smart glasses 22 are worn as eyeglasses and can provide a visual display overlaid in view of the user along with interaction with the mobile device 12. The smart glasses 22 can also include a video recorder. The smart head-mounted computer 24 can be a mounted on top of a helmet and can include a video recorder and the like. Also, the user can wear so-called non-smart devices such as the conventional watch 28. As described herein, in an exemplary aspect, the method and apparatus are configured to detect the presence of the non-smart devices. Note, in FIG. 1, the wearable devices 14-24 are illustrated with PAN links 30 between one another. Of course, the wearable devices 14-24 can communicate in a mesh fashion with one another. The mobile device 12 is illustrated with a WAN/WLAN link 32 to the base station 26. The links 30, 32 are utilized for various communication in the wearable system 10.

Crowd-Sourced Configuration of Wearable Devices

Figure 2:
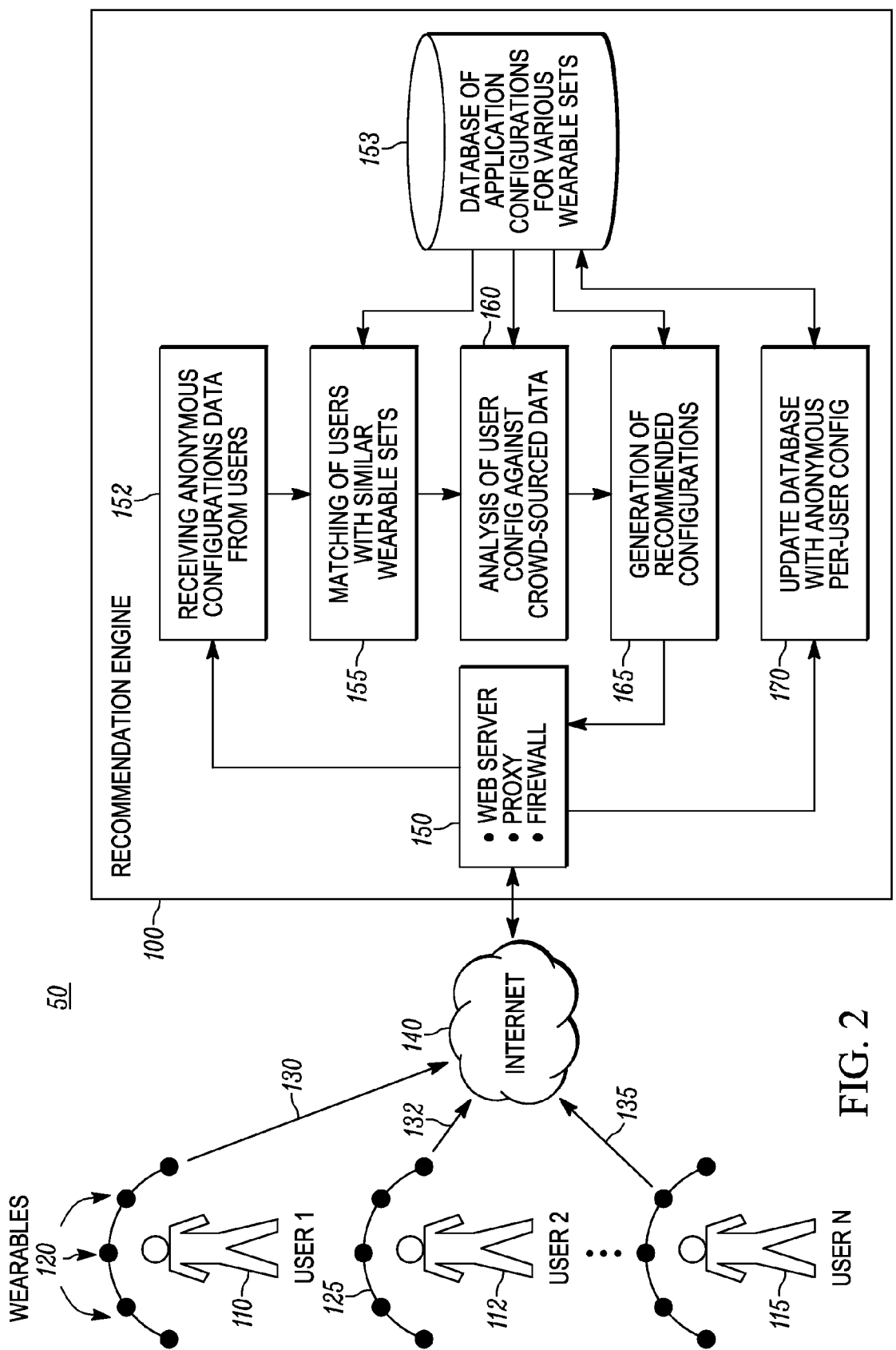
FIG. 2 is a network diagram of a wearable system with a recommendation engine in accordance with some embodiments.

FIG. 2 is a network diagram of a wearable system 50 with a recommendation engine 100. The recommendation engine 100 can be implemented on one or more cloud servers. The wearable system 50 includes a plurality of users 110, 112, 115 each fitted with multiple wearable devices 120. The wearable devices 120 can include the wearable devices 14-24 and the like, and the wearable devices 120 can form a PAN 125 with one another and the mobile device 12. Also, the users 110, 112, 115 can each have a mobile device 12. The users 110, 112, 115, via the associated mobile devices 12, have wireless links 130, 132, 135 to a WLAN/WAN 140, such as the Internet, for communication with the recommendation engine 100. The cloud-based recommendation engine 100 also connects to the Internet via a firewall/gateway/web server 150 as is common practice. Also, while only illustrated with the users 110, 112, 115, the wearable system 50 contemplates a large number of users.

Variously, the recommendation engine 100 recommends optimal applications and configurations of smart, wearable devices worn together on the user 110, 112, 115 based on feedback and analysis. The recommendation engine 100 is implemented via computer-executable instructions that, when executed, cause a processor to perform various steps. The recommendation engine 100 includes the steps of receiving anonymous applications and configurations data from the users 110, 112, 115 (step 152), matching the applications and configurations data against similar crowd-sourced applications and configurations stored in a database 153 (step 155), performing an analysis of the differences between the user's applications and configurations and most popular crowd-sourced applications and configurations (step 160), and generating recommended applications and configurations (step 165) that are provided back to the user 110, 112, 115 for manual or automatic updates to the user's wearable configuration. The recommended applications and configurations can be provided via the mobile device 12. In an exemplary embodiment, the recommended applications and configurations can be manually configured by the user 110, 112, 115. In another exemplary embodiment, the recommended applications and configurations can be automatically implemented to configure the wearable devices 120. For example, the mobile device 12 can automatically configure/provision the wearable devices 120 based on the recommended applications and configurations. Also, a combination of the manual and automatic processes can be used.

Since the users 110, 112, 115 may customize their configuration, the recommendation engine 100 also includes the step of updating the database 153 based on using preferably anonymous configuration data from each of the users 110, 112, 115 (step 170). The updates can be used to fine tune the analysis over time. That is, the more users 110, 112, 115 providing information, the recommendation engine 100 can optimize the analysis based on the users 110, 112, 115, their roles, and usage patterns associated with applications and functionality of the wearable devices 120.

With the recommendation engine 100, when the wearable devices 120 are worn together (e.g. the smart watch 18, the smart band 20, and/or the smart glasses 22) and joined into the PAN 124, preferably, anonymous usage information is collected from each wearable device. For example, in addition to the recommendation engine 100, a recommendation application can be operated on the mobile device 12 for interacting with the recommendation engine 100 and for performing various functions described herein with the PAN 125. Alternatively, the functionality associated with interacting with the recommendation engine 100 can be performed directly by the wearable devices 120 (e.g., either wirelessly if available, or when the wearable devices 120 are connected to a device that provides connectivity to the recommendation engine 100). This anonymous usage information includes one or more of: applications installed on each device, application settings, application usage, device settings, device usage, application versions, etc.

Note, the usage information may be anonymous for privacy protection. However, the usage information can include the role or function of the user including a specific organization. For example, a member of a certain fire department, police force, company, organization, etc. In this manner, while privacy is protected, the recommendation engine 100 can receive relevant information regarding applications and configurations for specific roles as well as for specific roles by organization and provide the recommended applications and configurations accordingly.

The user's wearable devices 120 or the mobile device 12 periodically transmits these usage statistics to the recommendation engine 100. Comparing each user's wearable applications and configuration against aggregate applications and configurations for a large population of the users 110, 112, 115, the recommendation engine 100 provides crowd-sourced recommendations to the users 110, 112, 115 such as optimal application settings for each of the wearable devices 120 based on data derived from other users 110, 112, 115 with similar sets of the wearable devices 120.

In an exemplary operation of the recommendation engine 100, a user wears the smart watch 18, the smart glasses 22, the mobile device 12, a smart ring, and a biometric band (such as the smart band 20). Each of these wearable devices 120 is linked into the PAN 125. At least one of the devices also has WAN connectivity, e.g. the mobile device 12, such as cellular data or Wi-Fi via a gateway such as smart phone or wireless modem. The wearable devices 120 periodically transmit information, including a device identifier (ID), active/inactive applications, and application settings to the recommendation engine 100. The recommendation engine 100 incorporates this information to a large data set derived from anonymous configuration data collected from a large population of wearable users. The recommendation engine 100 employs well known statistical techniques to correlate configuration and usage information from the users 110, 112, 115 with identical or similar sets of wearable devices 120 as well as similar user types or roles (e.g., student, lawyer, tradesmen, emergency first responder, etc.). The result of this analysis is that the users 110, 112, 115 receive recommendations from the recommendation engine 100 with advice on optimizing the configuration of their own wearable devices 120 based on crowd-sourced data. For example, the recommendation engine 100 may suggest the following configuration based on a crowd-sourced survey of other users 110, 112, 115 with identical or similar wearable hardware and similar roles:

| User Type/Role: | Professional |
|---|---|
| Smart watches: | time and event notification |
| Smart glasses: | Search, navigation, and messaging |
| Smart phone: | Multi-function including email |
| Smart band: | Calories, biometric monitoring |
| Smart ring: | Vibrate/alert for new calendar events and priority messages |

Another example for a public safety user can include:

| User Type/Role: | Firefighter |
|---|---|
| Smart mask: | Biometric monitoring including temperature, oxygen levels, breathing, etc. |
| Smart head-mounted computer: | Search, location, and messaging |
| Smart radio: | Multi-function including Push-to-Talk |
| Smart band: | Biometric monitoring including pulse, blood pressure, etc. |
| Smart ring: | Vibrate/alert for priority messages |

The recommendation engine 100 is not simply making recommendations for applications and configurations for a standalone device, but rather looks at the user's 110, 112, 115 complete configuration of the wearable devices 120 as a system and compares this data with other users 110, 112, 115 who have the same or a similar system of the wearable devices 120 and the same or similar role. Based on the wearable devices 120 and the role, the recommendation engine 100 provides the recommended configuration for configuring each of the wearable devices 120 in a synergistic manner based on crowd-sourced data, from the database 153.

Again, the recommendation engine 100 can operate with both configuration information and application information. The configuration information can include, without limitation, which types of wearable devices are used, device settings, user customizable settings in the applications, etc. For example, the configuration information can include settings related to how something is monitored, such as time of day, or settings related to how information is reported. The application information can include which applications are installed, application functionality, application usage information, etc. For example, the application information can include that a smart bracelet is configured for heart rate monitoring and to display a clock, as well as usage information. Generally and collectively, the configuration information and application information relate to anything adjustable on or with the wearable devices 120.

Figure 3:
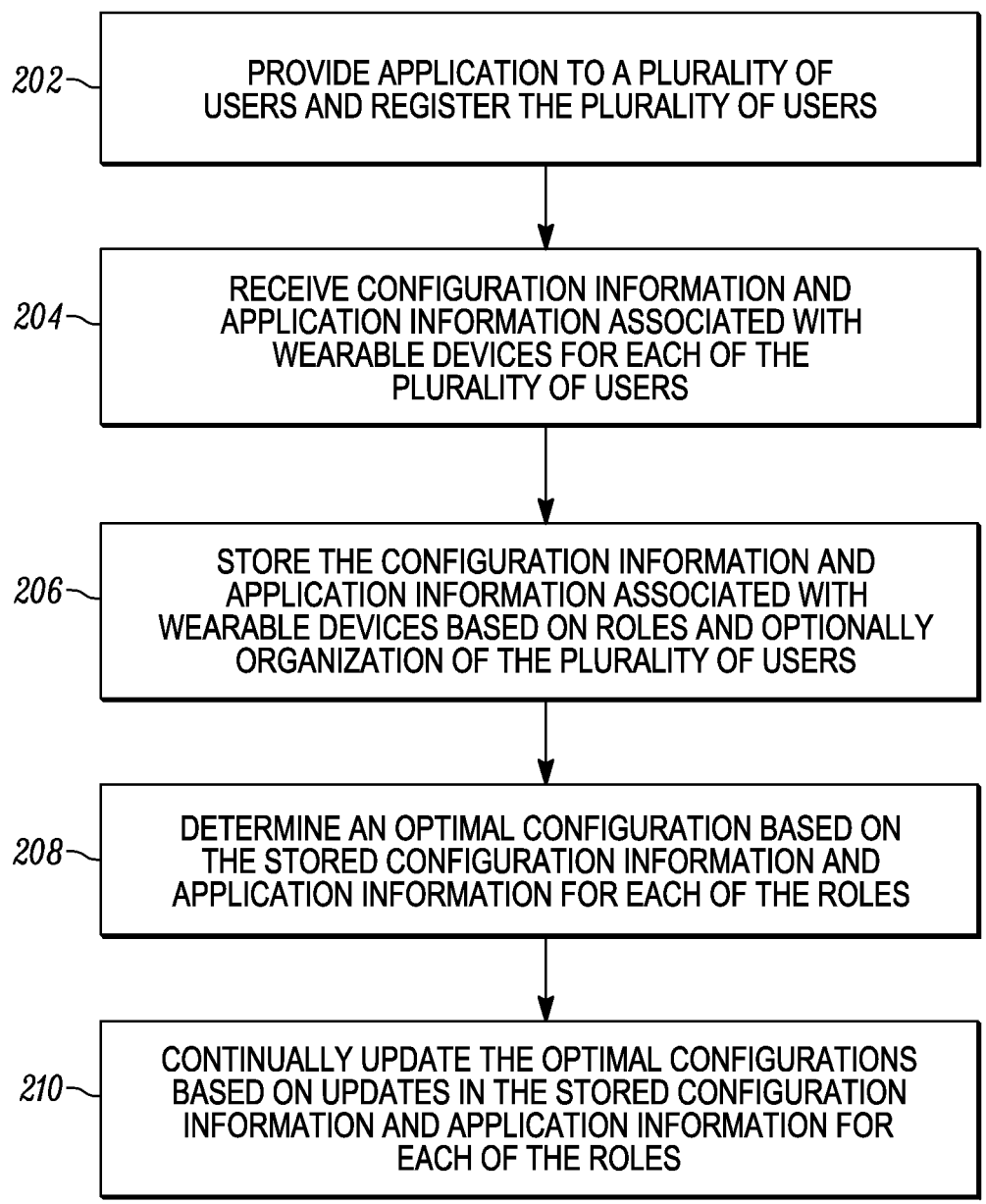
FIG. 3 is a flow chart of a configuration process with the recommendation engine in accordance with some embodiments.

FIG. 3 is a flow chart of a configuration process 200 with the recommendation engine 100. In some embodiments, more or fewer steps could be included in the configuration process 200. The configuration process 200 is used by the recommendation engine 100 to develop and refine data in the database 153. The configuration process 200 contemplates operation in the wearable system 50 by the recommendation engine 100 communicating with the users 110, 112, 115. The configuration process 200 includes providing an application to a plurality of users and registering the plurality of users (step 202). The application can be configured to coordinate functionality between the wearable devices 120 and the recommendation engine 100. That is, the application can provide information sharing to the recommendation engine 100 from the users 110, 112, 115 and optimal applications and configurations for the wearable devices 120 from the recommendation engine 100. In an exemplary embodiment, the application can be implemented on the mobile device 12 such as a stand-alone application, a web browser plugin, or the like. In another exemplary embodiment, the application can be implemented on one or more of the wearable devices 120. A combination of these approaches is also contemplated. The registration for each of the users 110, 112, 115 can include setting up an account and at a minimum providing a description of a role or function of each user 110, 112, 115. Other information can also be provided during the registration.

The configuration process 200 includes receiving configuration information and application information, e.g. a first configuration, associated with wearable devices for each of the plurality of users (step 204). The configuration information and application information can be anonymous, but classified by role or function and optionally by the organization. The configuration information can include which types of wearable devices 120 are used, including brand of the wearable devices 120, application/functional settings of the wearable devices 120, time of usage of the wearable devices 120, and the like. The application information can include functionality used on the wearable devices 120, usage information of the wearable devices 120, applications used on the wearable devices 120, and the like. Basically, the configuration information and application information provides the recommendation engine 100 a snapshot of which of the wearable devices 120 are used by the users 110, 112, 115 and how the wearable devices 120 are used.

The configuration process 200 includes storing the configuration information and application information associated with the wearable devices based on roles and optionally organization of the plurality of users (step 206). Here, the configuration process 200 is developing the database 153 to determine and characterize the optimal applications and configurations by role and optionally by the organization. For example, a typical student will have a different set of the wearable devices 120 and configurations/applications from a first responder. Also, a first responder from one police department, for example the New York Police Department (NYPD), may have both a different set of the wearable devices 120 and configurations/applications from a first responder from another police department, for example the Los Angeles Police Department (LAPD), etc.

The configuration process 200 includes determining an optimal configuration based on the stored configuration information and application information for each of the roles (step 208). Here, the configuration process 200 consolidates all of the different configurations and applications from a large number of the users 110, 112, 115 by their roles (and optionally by their organization) and derives the optimal configuration for each of the roles (and optionally by organization) based on data mining and analysis of the different configurations and applications from a large number of the users 110, 112, 115. Additionally, the configuration process 200 can continually update the optimal applications and configurations based on updates in the stored configuration information and application information for each of the roles (step 210). Here, it is expected that the recommendation engine 100 will continually receive information regarding configurations and applications, and continually tweak and evolve the optimal configurations and applications.

Figure 4:
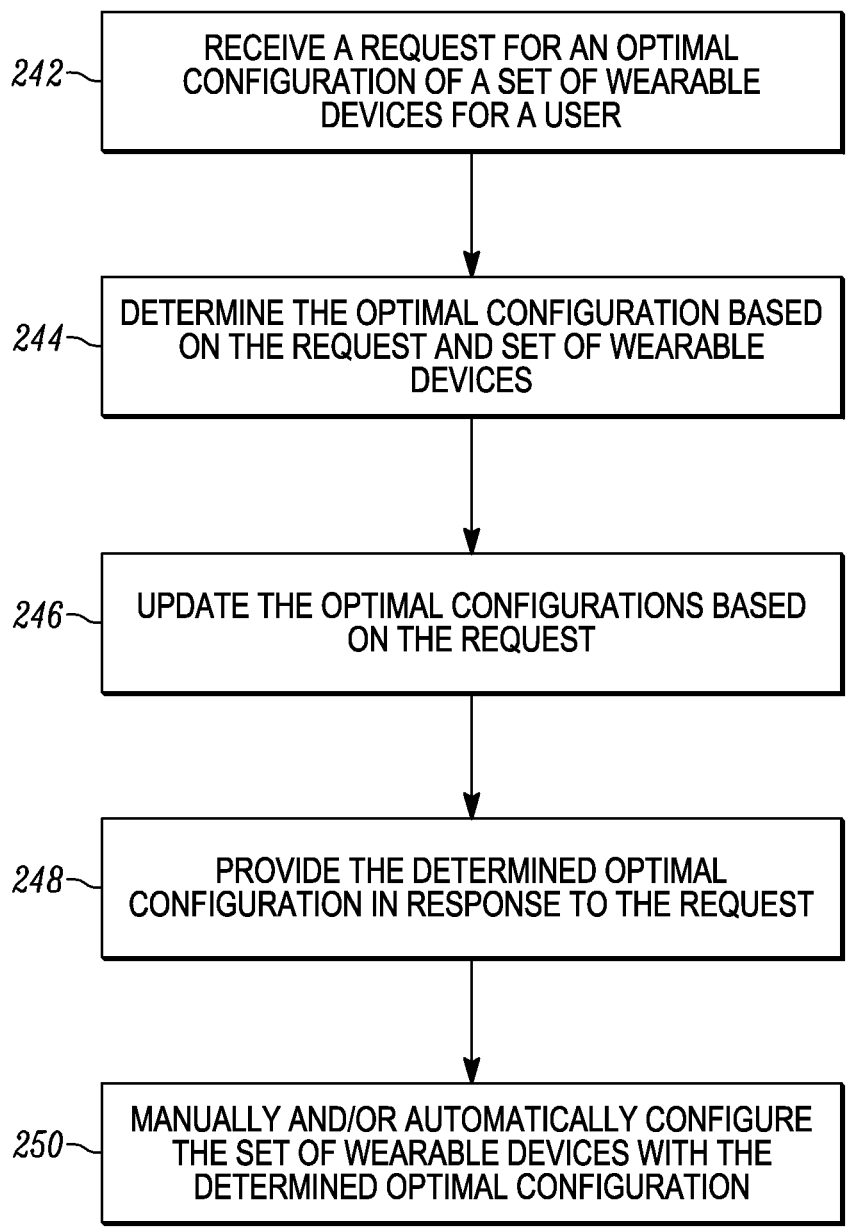
FIG. 4 is a flow chart of a recommendation process with the recommendation engine in accordance with some embodiments.

FIG. 4 is a flow chart of a recommendation process 240 with the recommendation engine 100. In some embodiments, more or fewer steps could be included in the recommendation process 240. The recommendation process 240 is used by the recommendation engine 100 to provide one of the users 110, 112, 115 an optimal configuration based on data in the database 153. The recommendation process 240 contemplates operation in the wearable system 50 by the recommendation engine 100 communicating with the users 110, 112, 115, and in conjunction with the configuration process 200. The configuration process 200 is implemented by the recommendation engine 100 communicating with a user of the users 110, 112, 115 and, optionally, with the user operating the application from the configuration process 200.

The recommendation process 240 includes receiving a request for a recommended configuration of a set of wearable devices for a user (step 242). Here, a specific user is requesting the optimal configuration. This can be done through the application, through a browser plugin, or based on manually inputting the wearable devices 120. The request can include the role and optionally the organization of the user. Additionally, the request can include the wearable devices 120 associated with the user.

The recommendation process 240 includes determining the optimal configuration based on the request and the set of wearable devices 120 (step 244). The recommendation engine 100, through the recommendation process 240, is configured to provide crowd-sourced recommendations to simplify the task of configuring the user's wearable devices 120. The determining step 244 focuses on optimizing the functionality provided by each of the wearable devices 120 (e.g., time and alerts on smart watch, biometric indicators on smart band, critical information on head mounted display, etc.). The determining step 244 also focuses on avoiding duplicate functionality (e.g., multiple devices of the wearable devices 120 do not display the same information such as incoming messages, time/date, event notification, location based services, etc.).

Recommendations may be categorized not only by the wearable devices 120 in use, but also by task, event, occupation, user type, and time-of-day. For example, students may have their wearable devices 120 configured to provide different functions than parents with similar sets of wearable devices 120. Workers in mission critical fields such as police and fire would likely choose to have different functions display on smart glasses than workers in other fields, etc. Also, wearable configurations may vary during working and non-working hours.

The recommendation engine 100 correlates types of users, job functions, and other segmentation information (information received in the request as well as from the application in the configuration process 200) with sets of wearable devices 120 to provide fine-grained recommendations on optimal applications and configurations of the wearable devices 120. Well known data mining, statistical and other data analysis techniques are employed by the recommendation engine 100 to filter and analyze crowd-sourced information based on data from the user's wearable devices 120 to provide crowd-sourced recommendations.

The recommendation process 240 can include updating the optimal applications and configurations based on the request (step 246). Here, data from the request by the user can be incorporated in the database 153, such as through the configuration process 200. The recommendation process 240 includes providing the determined optimal configuration in response to the request (step 248). The recommendation engine 100 can provide the determined optimal configuration over the WAN 140 and through the links 130, 132, 135. The recommendation process 240 includes manually and/or automatically configuring the set of wearable devices 120 with the determined optimal configuration (step 250). Here, the wearable devices 120 are automatically configured based on the determined optimal configuration and/or the determined optimal configuration is presented to the user 110, 112, 115 for manual configuration.

The users 110, 112, 115 can view the determined optimal configuration recommended by the recommendation engine 100, as well as accept and personalize the determined optimal configuration from the recommendation engine 100. Personalized settings are of course deviations from the determined optimal configuration provided by the recommendation engine 100. These customizations are anonymously fed back to the recommendation engine 100 further enhancing recommendations for other users. Custom settings can be implemented in various ways known in the art such as thumbs up/thumbs down buttons, menus, etc.

As described herein, the recommendation engine 100 is typically embodied by a cloud-based server that collects anonymous information from a large population of wearable users and provides crowd-sourced recommendations based on analysis of this information. In another exemplary embodiment, the recommendation engine 100 can be limited to a specific workgroup to serve a limited workgroup or social group of users such as fire fighters that have similar wearable devices 120 and applications and configurations.

The wearable devices 120 can exchange configuration statistics, in a peer-to-peer fashion with the mobile device 12. In the exemplary embodiment where the recommendation engine 100 is segregated to a specific workgroup, the statistics may be viewable, and optionally anonymous, so that new users to the workgroup can leverage the wearable apps and settings used within the workgroup. In an exemplary embodiment of this peer-to-peer approach, the recommendation engine 100 can run on a single wearable device 120 or the application may be distributed across the peer workgroup's wearable device 120 for improved redundancy.

In another exemplary embodiment, in the case of the specific workgroup, the statistics from the wearable devices 120 may be consolidated and presented for optimization. For example, in case of first responders, the statistics are useful in determining procedures looking at historical statistics for specific incidents with the first responders. Also, in the case of an organization, the statistics can be used for health monitoring purposes, e.g. ensuring employees are maintaining healthy lifestyles to improve group health insurance premiums. Various other embodiments are contemplated.

Dynamic Reconfiguration on Device Addition or Removal

Figure 5:
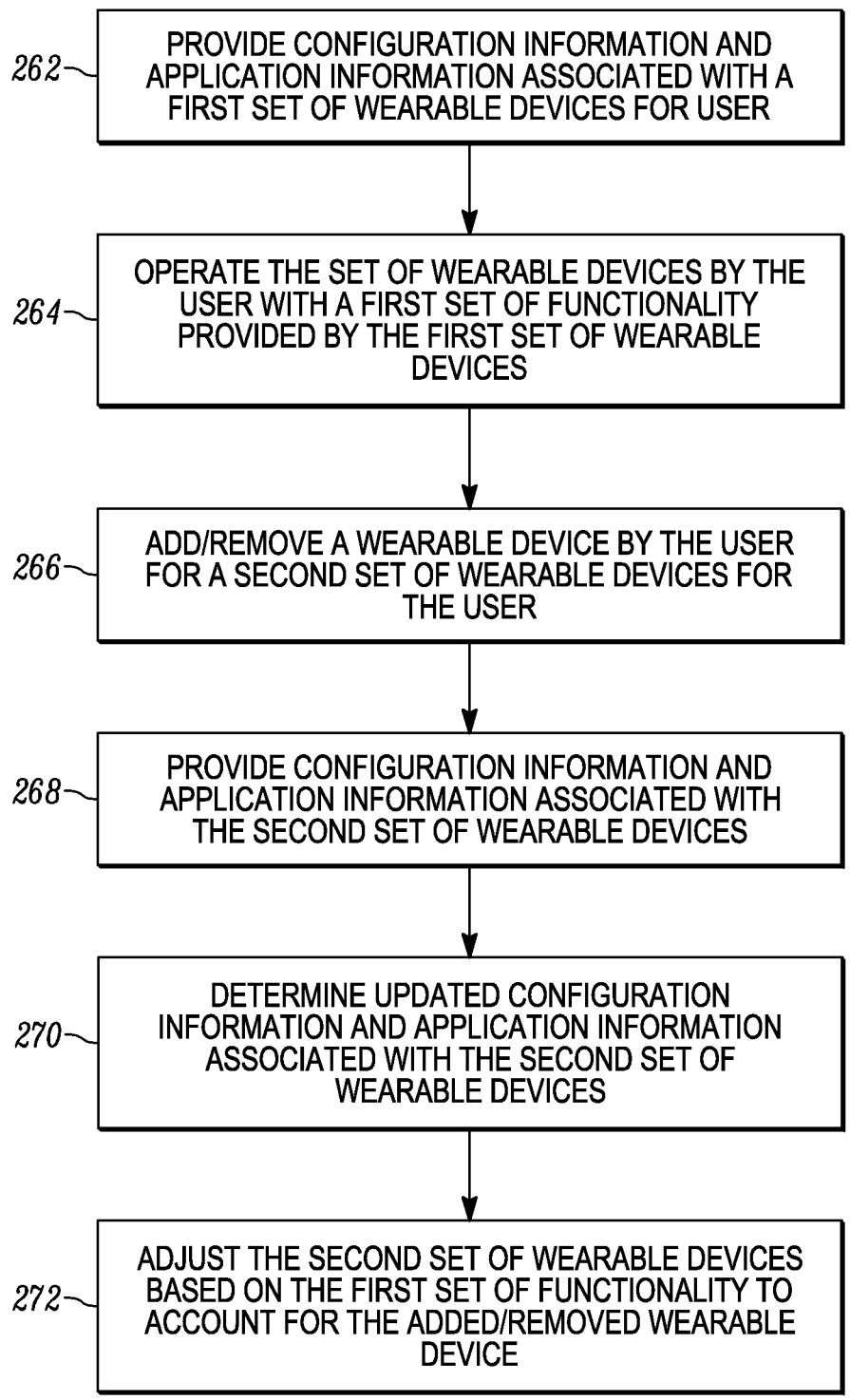
FIG. 5 is a flow chart of a dynamic reconfiguration process for one of the users with the wearable devices in the wearable system of FIG. 2 in accordance with some embodiments.

FIG. 5 is a flow chart of a dynamic reconfiguration process 260 for one of the users 110, 112, 115 with the wearable devices 120. In some embodiments, more or fewer steps could be included in the dynamic reconfiguration process 260. The dynamic reconfiguration process 260 is used by the wearable devices 120 local to the user 110, 112, 115 to reconfigure in order to replace the lost functionality or avoid duplicate functionality when a wearable device is added/removed. That is, the dynamic reconfiguration process 260 is another aspect of the method and apparatus that can, in response to removing one of the wearable devices 120, trigger the remaining wearable devices 120 to reconfigure in order to replace the lost functionality, if possible. The dynamic reconfiguration process 260 contemplates operation in the wearable system 50 by the wearable devices 120, the mobile device 12, and/or the application, local to the user 110, 112, 115 and optionally with the recommendation engine 100. The dynamic reconfiguration process 260 contemplates operation with the configuration process 200 and/or the recommendation process 240.

The dynamic reconfiguration process 260 includes providing configuration information and application information associated with a first set of wearable devices for user 110, 112, 115 (step 262). For example, the recommendation engine 100 can be operated with the user 110, 112, 115, either in the mobile device 12 and/or on the wearable devices 120. Here, the application can periodically provide the configuration information and application information to the recommendation engine 100 such as described in the configuration process 200. Note, the step 262 can be optional, and the dynamic reconfiguration process 260 also contemplates local operation, at the user 110, 112, 115, without communicating with the recommendation engine 100.

The dynamic reconfiguration process 260 includes operating the set of wearable devices 120 by the user 110, 112, 115 with a first set of functionality provided by the first set of wearable devices 120 (step 264). The first set of functionality is a baseline—this is the functionality, presently used by the user 110, 112, 115 with the wearable devices 120. Again, the functionality can be anything done by the wearable devices 120, such as gathering sensor data, presenting messages, alerts, etc., and the like.

The dynamic reconfiguration process 260 includes adding/removing a wearable device by the user 110, 112, 115 to obtain a second set of wearable devices 120 for the user 110, 112, 115 (step 266). Here, the user 110, 112, 115 has added or removed one of the wearable devices 120, and now there is a second set of functionality—which may be different or duplicative of the first set of functionality. Optionally, the dynamic reconfiguration process 260 includes providing configuration information and application information associated with the second set of wearable devices 120 to the recommendation engine 100 (step 268).

The dynamic reconfiguration process 260 includes determining updated configuration information and application information associated with the second set of wearable devices 120 (step 270). The determining is to either accommodate lost functionality where the second set of wearable devices 120 has less devices than the first set of wearable devices 120 or avoid duplicate functionality where the second set of wearable devices 120 has more devices than the first set of wearable devices 120. The dynamic reconfiguration process 260 includes adjusting the second set of wearable devices 120 based on the first set of functionality to account for the added/removed wearable device (step 272).

For example, consider the case where the user 110, 112, 115 removes their smart watch 18, this may trigger another wearable device 120 to display the time and date, such as, for example, a time/date app can be automatically started on the user's smart band 20 to replace the lost functions of the smart watch 18. As described above, the new configuration sans the smart watch 18 can be derived from crowd-sourced recommendations through the recommendation engine 100. The new configuration can be initiated with or without user intervention. Similarly, adding a wearable device can cause the user's set of wearable devices 120 to reconfigure based on recommendations provided by the recommendation engine 100 to avoid duplication and add new functionality. Also, this can operate without the recommendation engine 100. Furthermore, multiple variations of the user's working set of wearable devices 120 may be cached in the devices. This eliminates the need to query the recommendation engine 100 each time that devices are added or deleted. Also, cached recommendations may be periodically updated by downloading new recommendations from the recommendation engine 100. Of course, users can personalize the crowdsourced recommendations and these customizations may also be cached.

Exemplary Server for the Recommendation Engine

Figure 6:
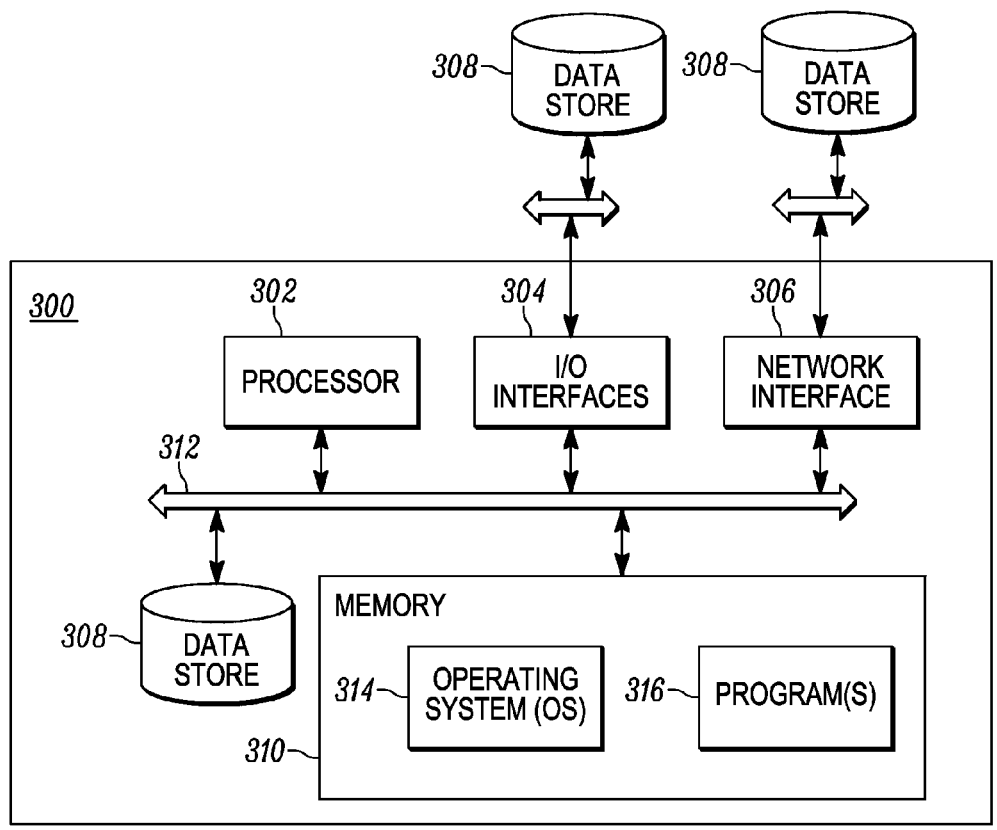
FIG. 6 is a block diagram of a server which may be used for the recommendation engine, in other systems, or stand-alone in accordance with some embodiments.

FIG. 6 is a block diagram of a server 300 which may be used for the recommendation engine 100, in other systems, or standalone. For example, the cloud-based recommendation engine 100 may be formed as one or more of the servers 300. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 6 depicts the server 300 in a simplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 140, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein. Specifically, the one or more programs 316 can be configured to implement the various processes 200, 240 and functionality associated with the recommendation engine 100.

Exemplary Device for the Mobile Device or Wearable Devices

Figure 7:
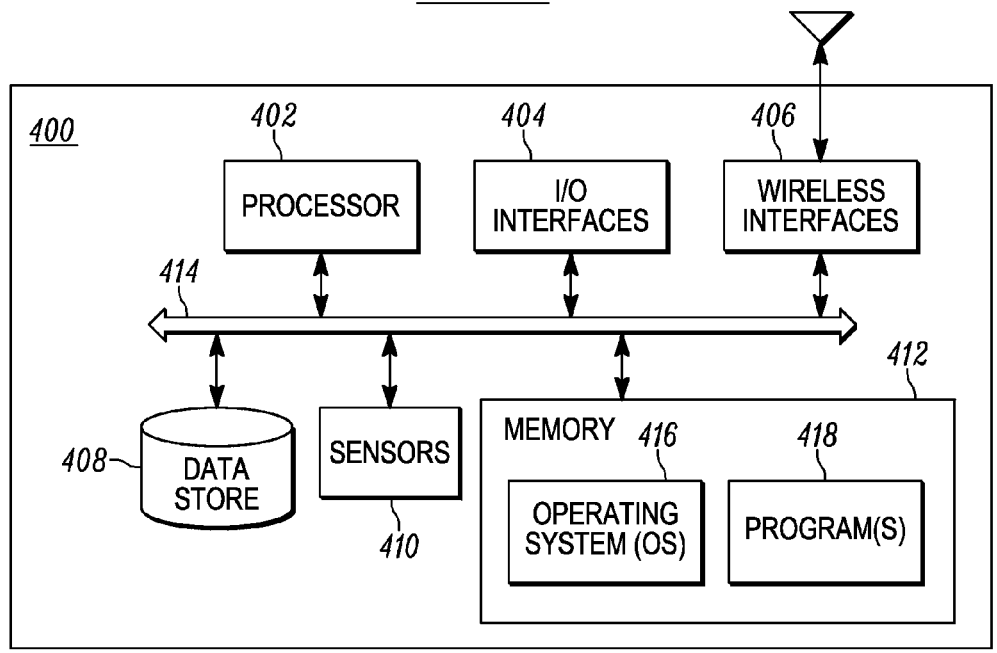
FIG. 7 is a block diagram of a mobile device, which may be used for the mobile device or the wearable devices in accordance with some embodiments.

FIG. 7 is a block diagram of a mobile device 400, which may be used for the mobile device 12, the wearable devices 14-24, the wearable devices 120, or the like. The mobile device 400 can be a digital device that, in terms of hardware architecture, generally includes a processor 402, input/output (I/O) interfaces 404, wireless interfaces 406, a data store 408, one or more sensors 410, and memory 412. It should be appreciated by those of ordinary skill in the art that FIG. 7 depicts the mobile device 400 in an oversimplified manner, and a practical embodiment may include additional components and suitably configured processing logic to support known or conventional operating features that are not described in detail herein. The components (402, 404, 406, 408, 410, and 412) are communicatively coupled via a local interface 414. The local interface 414 can be, for example but not limited to, one or more buses or other wired or wireless connections, as is known in the art. The local interface 414 can have additional elements, which are omitted for simplicity, such as controllers, buffers (caches), drivers, repeaters, and receivers, among many others, to enable communications. Further, the local interface 414 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 412, to communicate data to and from the memory 412, and to generally control operations of the mobile device 400 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, mini-USB, proprietary interfaces, and the like. The I/O interfaces 404 can include a graphical user interface (GUI) that enables a user to interact with the mobile device 400. Additionally, the I/O interfaces 404 may further include an imaging device, i.e. camera, video camera, etc.

The wireless interfaces 406 enables wireless communication to an external access device or network. Any number of suitable wireless data communication protocols, techniques, or methodologies can be supported by the wireless interfaces 406, including, without limitation: RF; IrDA (infrared); Bluetooth; Bluetooth Low Energy (BLE); ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The sensors 410 are used to capture data and/or assist in operation of the mobile device 400. When the mobile device 400 is a smart phone, tablet, etc., the sensors 410 can include a proximity sensor, a light sensor, an accelerometer, a magnetometer, a gyroscope, a thermometer, Global Positioning Satellite (GPS), and the like. When the mobile device 400 is one of the wearable devices 14-24, 120, the sensors 410 can include a proximity sensor, a light sensor, an accelerometer, a magnetometer, a gyroscope, a thermometer, GPS, a pedometer, a heart monitor, and the like. The mobile device 400 can use any type of sensor 410 for obtaining data.

The memory 412 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 412 may incorporate electronic, magnetic, optical, and/or other types of storage media. Note that the memory 412 may have a distributed architecture, where various components are situated remotely from one another, but can be accessed by the processor 402. The software in memory 412 can include one or more software programs, each of which includes an ordered listing of executable instructions for implementing logical functions. In the example of FIG. 7, the software in the memory 412 includes a suitable operating system (O/S) 416 and programs 418. The operating system 416 essentially controls the execution of other computer programs, and provides scheduling, input-output control, file and data management, memory management, and communication control and related services. The programs 418 may include various applications, add-ons, etc. configured to provide end user functionality with the mobile device 400. For example, exemplary programs 418 may include, but not limited to, a web browser, social networking applications, streaming media applications, games, mapping and location applications, electronic mail applications, financial applications, and the like. When the mobile device 400 is a wearable device 14-24, 120, the operating system 416 and the programs 418 may be integrated to provide a set of functionality.

Sensor Selection Through Crowd Sourcing

In another exemplary aspect of the method and apparatus, some or all of the wearable devices 120 contain the sensors 410 (e.g. accelerometers, cameras, microphones, temperature, health sensors, etc.). It is known in the art that sensors in a collaborative system can be shared by other devices in the system. For example, one sensor 410 may measure ambient temperature and other devices can share the data via PAN 125. Furthermore, when a plurality of similar sensors 410 (e.g. multiple temperature sensors) is present in the PAN 125, it makes sense to choose one of the sensors 410 to provide measurements and share the output with the wearable devices 120 or application rather than have a plurality of sensors 410 of the same type active.

Figure 8:
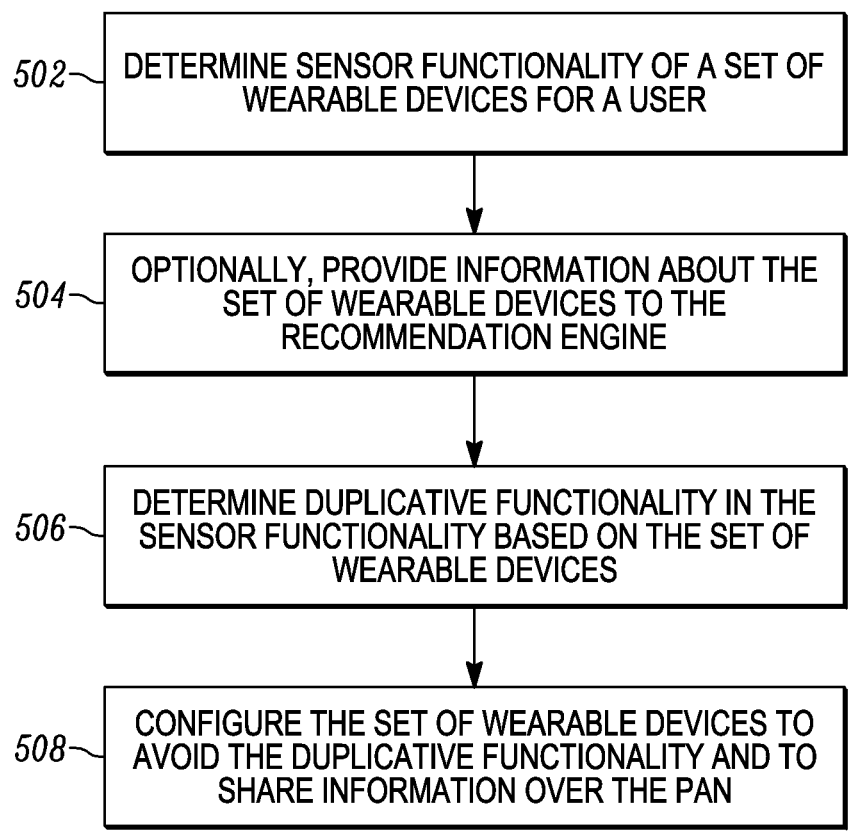
FIG. 8 is a flow chart of a sensor selection process with the wearable devices in accordance with some embodiments.

FIG. 8 is a flow chart of a sensor selection process 500 with the wearable devices 120. In some embodiments, more or fewer steps could be included in the sensor selection process 500. The sensor selection process 500 is used by the wearable devices 120 local to the user 110, 112, 115 to configure the wearable devices 120 to avoid duplicate sensor 410 functionality. The sensor selection process 500 contemplates operation in the wearable system 50 of the wearable devices 120, the mobile device 12, and/or the application, local to the user 110, 112, 115 and optionally with the recommendation engine 100. The sensor selection process 500 contemplates operation with the configuration process 200, the recommendation process 240, and/or the dynamic reconfiguration process 260.

The sensor selection process 500 includes determining sensor functionality of a set of wearable devices 120 for a user 110, 112, 115 (step 502). Optionally, the sensor selection process 500 can include providing information about the set of wearable devices 120 to the recommendation engine 100 (step 504). Specifically, the user 110, 112, 115 can utilize the application to communicate with the recommendation engine 100. The recommendation engine 100 can assist in performing the sensor selection process 500. The sensor selection process 500 includes determining duplicative functionality in the sensor functionality based on the set of wearable devices 120 (step 506). Again, this can be performed local to the user 110, 112, 115, such as with the application, and/or with the recommendation engine 100. Duplicative functionality can include, without limitation, temperature readings, health monitoring, information display such as time and messages, location, activity monitoring, etc. The sensor selection process 500 includes configuring the set of wearable devices 120 to avoid the duplicative functionality and to share information over the PAN 125 (step 508). Here, the application and/or the recommendation engine 100 can cause configuration of the set of wearable devices 120 to avoid the duplicative functionality. For example, only one device actively displaying time, only one device actively determining location, etc. The other devices can receive the sensor 410 information via the PAN 125.

Rather than share a pre-determined sensor or force the user to manually choose a sensor from a control panel, an improvement over existing art is to utilize the recommendation engine 100 to provide crowd-sourced recommendations. In a crowd-sourced environment, it is likely that many users 110, 112, 115 with similar applications and configurations of the wearable devices 120 have already evaluated and chosen sensors that provide the best performance, highest accuracy, battery life, etc. Thus, a user's wearable devices 120 can query the recommendation engine 100 to determine which sensor 410 from among a plurality of similar sensors 410 is considered the best choice (based on crowd-sourced recommendations). The user's wearable devices 120 can then choose this sensor 410 for system-wide sharing and disable similar redundant sensors for power savings.

In another exemplary embodiment, instead of using crowd-sourced recommendations as described above, sensor recommendations can be determined based on technical data such as actual performance specifications for available sensors 410. The distinction here is that crowd sourced data is based on popularity within the user base and indicates a preferred sensor choice based on tracking and ranking the most commonly used sensor applications and configurations amongst a set of available sensors 410. By comparison, an alternative method is to load technical information into the recommendation engine 100 such as measured sensor accuracy, power consumption, etc. and use this objective data to choose the sensor 410.

Dynamic Reconfiguration of Application Linkages

The output of an application executing on one of the wearable devices 120 and the mobile device 12 that is a member of the PAN 125 can be used by other application(s) on the PAN 125. For example, an application producing location data can share this information with other applications on the PAN 125. Since a key aspect of the method and apparatus optimally configures applications running on a user's wearable devices 120, it is necessary to preserve the linkage of applications, sourcing and sinking data so that information flows are maintained even when the wearable devices 120 are added or removed from the PAN 125 or available applications change based on crowd-sourced optimizations. For example, if the user 110, 112, 115 removes a fitness band that was sourcing biometric data to other applications on the PAN 125, another device/application combination capable of providing this information can be recommended for use or substituted automatically (if available). In a similar way, if a device that sinks (consumes) data from other applications (e.g. a smart ring that provides event notifications to the user 110, 112, 115) is removed or added, another device/application combination capable of providing this functionality can be recommended for use or substituted automatically (if available).

Similarly, the devices 12, 120 in the PAN 125 may be constant; however, the user 110, 112, 115 may choose to update their wearable applications configuration based on crowd-sourced data as described herein. The new configuration of applications may entail a change to the application or application/device combination sourcing the data. For example, in the initial state the PAN 125 may source ambient temperature/humidity from an application on the user's smart watch 18. The user 110, 112, 115 may then choose to reconfigure their wearable applications configuration based on crowd-sourced recommendations from the recommendation engine 100. As an example, the new recommendations may include use of a different temperature/humidity application on the user's smart watch 18 or use of a different temperature/humidity application on another device such as the user's smart glasses 22. In either case, it is an object of the method and apparatus to maintain the linkage of devices/applications providing data and applications consuming data when there is a change to devices or applications on the PAN 125. The process of maintaining connections between applications on the PAN 125 can typically be embodied by using well-known techniques such as Service Discovery Protocols (SDP) that allow applications to make use of one another's services without user intervention. The method and apparatus maintains the linkage of combinations of devices and applications sourcing and sinking data following reconfiguration of a wearable device 120 in the PAN 125 triggered by: 1) removing or adding a device (and the resulting reconfiguration based on crowd-sourced data) or; 2) reconfiguring the PAN 125 to use different source and/or sink apps as a result of crowd-sourced recommendations. Also, removal of one of the wearable devices 120 may be triggered by the device breaking or malfunctioning.

Security Precedence

In another exemplary aspect, the method and apparatus is sensitive to security concerns. For example, information such as messages is best displayed on the device(s) that provide privacy such as the smart glasses 22. Less sensitive info may be displayed on publically visible devices like the smart watches 18. The device that displays security sensitive information can change dynamically if the PAN 125 is reconfigured by the user adding or removing wearable devices 120, e.g. if the smart glasses 22 are removed from the PAN 125, then sensitive messages may be re-routed to the user's mobile device 12. Security rules can take precedence over preferences provided by the recommendation engine 100. Therefore, even if the user 110, 112, 115 derives applications and configurations from crowd-sourced recommendations, overriding security rules can force certain functions or applications to "stick" with certain devices (e.g. messages are only displayed on privately viewable devices).

Mechanical Watch Sensing

Another exemplary aspect of the method and apparatus is shown in FIG. 1. Even with the popularity of wrist-worn smart devices (e.g., the devices 18, 20), many users 110, 112, 115 will continue to wear traditional mechanical or quartz watches 28 alongside smart bands to provide complementary information such as calories burned, message alerts, etc. Since the conventional watches 28 already display time and date, smart bands incorporating magnetic sensors (Hall effect or similar) can sense the metallic housing of most conventional watches 28 and automatically adapt information displays to avoid duplicating the time displayed on the conventional watches 28. Similarly, smart devices may use Near Field Sensor (NFC) technology to detect adjacent wearable devices 120 on the user's wrist to provide complementary information displays as an alternative to using the PAN 125.

First Responder Application

Figure 9:
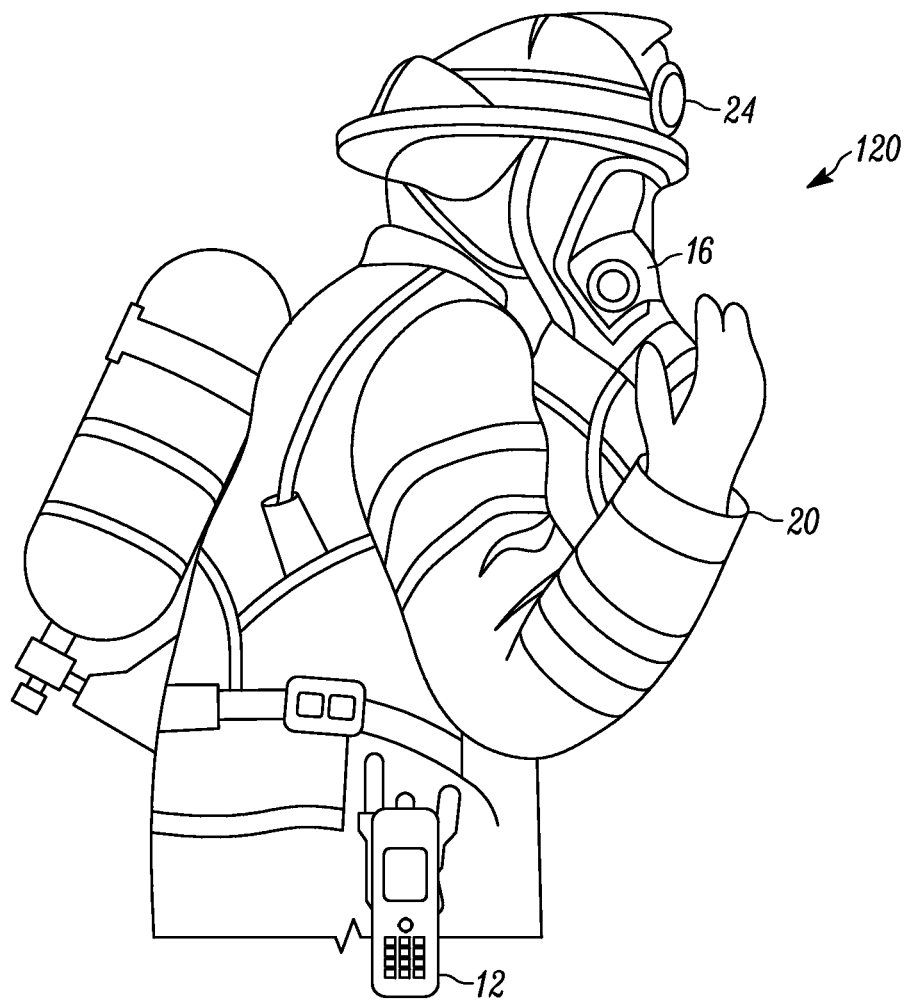
FIG. 9 is a perspective diagram of a first responder with a mobile device and a set of wearable devices in accordance with some embodiments.

FIG. 9 is a perspective diagram of a first responder 600 with a mobile device 12 and a set of wearable devices 120. For example, the first responder 600 can be a firefighter, and the set of wearable devices 120 can include a smart mask 16, a smart band 20, a smart head-mounted computer 24, and the like. The collective functionality can include displaying information in the field of view, heart rate monitoring, breathing monitoring, air quality monitoring, 2-way communications (e.g., Push-to-Talk), location mapping, etc. In an exemplary aspect, the method and apparatus provide quick setup of the set of wearable devices 120 including optimal applications and configurations based on the crowd-sourcing, either based on this fire department or all fire departments. The first responder 600 is involved in mission-critical work, and configuration of the wearable devices 120 is cumbersome. Automation of the configuration of the wearable devices 120 is advantageous. Furthermore, recovering lost functionality of the wearable devices 120 is extremely important in life threatening situations, such as when one of the wearable devices 120 breaks or malfunctions. Also, the first responder 600 can be a police officer, an Emergency Medical Technician (EMT), etc.

Key advantages of the method and apparatus include ensuring proper, optimal applications and configurations of the wearable devices 120 based on crowd-sourcing and/or based on specific department requirements as well as providing automated recovery for lost functionality. For example, a police officer can include a Mobile Digital Video Recorder (MDVR) worn on his body, and responsive to losing that functionality, audio recording may be turned on the mobile device 12 to ensure at least some of the functionality is recovered, if not all. Various other examples are also contemplated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method associated with a mobile device and a first set of a plurality of different types of wearable devices associated with a first user to provide a first set of functionality to the first user, the method comprising:
   utilizing the first set of different types of wearable devices in an initial application and configuration state to provide the first set of functionality to the first user, the first user being an identified first type of user associated with a particular user role;
   communicating data, in a Personal Area Network (PAN), between the first set of different types of wearable devices and the mobile device associated with the first user based on the first set of functionality;
   transmitting, to a wearable device set application and configuration recommendation engine, the (i) identified first type of user of the first user, (ii) identities of wearable devices in the first set of different types of wearable devices associated with the first user, (iii) application information identifying installed applications of the first set of different types of wearable devices providing the first set of functionality to the first user, and (iv) configuration information identifying customizable device and/or application configurations of the first set of different types of wearable devices; and
   receiving, from the wearable device set application and configuration recommendation engine, recommended application information and configuration information, wherein the recommended configuration is based on crowd-sourced data of other mobile devices having a substantially identical set of different types of wearable devices and substantially identical identified first type of user.

2. The method of claim 1, further comprising:
   removing a particular wearable device from the first set of different types of wearable devices to form a second set of a plurality of different types of wearable devices; and
   automatically adjusting a set of functionality provided by the second set of different types of wearable devices to the first user in a second configuration, determined as a function of the recommended application information and configuration information or second recommended application information and configuration information received from the wearable device set application and configuration recommendation engine, to recover functionality lost by the removing the particular wearable device.

3. The method of claim 2, wherein the automatic adjusting utilizes one or more security rules that are used to override recommendations of wearable device installed applications and customizable device and/or application configurations received from the wearable device set application and configuration recommendation engine.

4. The method of claim 1, further comprising:
   prior to receiving the recommended application information and configuration information from the wearable device set application and configuration recommendation engine, transmitting a request for the application information and configuration information to the wearable device set application and configuration recommendation engine.

5. The method of claim 4, further comprising:
   displaying the received recommended application information and configuration information and manually configuring the first set of different types of wearable devices based on the received recommended application information and configuration information.

6. The method of claim 4, further comprising automatically configuring the first set of different types of wearable devices based on the received recommended application information and configuration information.

7. The method of claim 1, wherein the first set of different types of wearable devices includes sensors capable of providing duplicative sensor functionality, and the method further comprising:
   configuring the first set of different types of wearable devices to avoid the first set of different types of wearable devices providing duplicative sensor functionality; and
   sharing sensor information based at least on the avoiding of duplicative sensor functionality over the PAN between the first set of different types of wearable devices and the mobile device.

8. The method of claim 7, wherein the configuring the first set of different types of wearable devices to avoid the first set of different types of wearable devices providing duplicative sensor functionality is based on crowd-sourced data from the wearable device set application and configuration recommendation engine and stored technical data associated with sensors in the first set of different types of wearable devices, the stored technical data including one or both of sensory accuracy and power consumption associated with sensors in the first set of different types of wearable devices.

9. The method of claim 1, wherein a particular wearable device of the first set of different types of wearable devices is a wrist worn device, the method further comprising:
   detecting a conventional watch using a magnetic sensor of the wrist worn device; and
   adjusting a configuration of the wrist worn device based on the detecting to avoid duplicating functionality at the wrist worn device that is already provided by the conventional watch.

10. The method of claim 1, further comprising:
    adding a particular wearable device to the first set of different types of wearable devices to form a second set of a plurality of wearable devices; and
    automatically adjusting a set of functionality provided by the second set of wearable devices to the first user in a second configuration, determined as a function of the recommended application information and configuration information or second recommended application information and configuration information received from the wearable device set application and configuration recommendation engine, to avoid duplicative functionality between the added particular wearable device and the remaining wearable devices in the second set of different types of wearable devices.

11. The method of claim 1, wherein the first set of the plurality of different types of wearable devices comprises two or more of i) a vitals and/or activity tracking band, ii) a smart watch, iii) a smart phone, iv) a heads-up display, v) computerized eyeglasses, vi) a smart mask, and vii) smart gloves.

12. A server operating as a wearable device set application and configuration recommendation engine for a plurality of mobile devices, each mobile device associated with a set of different types of wearable devices associated with a respective user and providing a first set of functionality to the respective user, the server comprising:
- a network interface communicatively coupled to a network;
- a processor communicatively coupled to the network interface; and
- memory storing instructions that, when executed, cause the processor to:
  - receive, from each of the mobile devices, (i) user identity information comprising an identity of a particular user-type of the respective user associated with the mobile device, the particular user-type being associated with a particular user role, (ii) wearable device information identifying wearable devices in a set of different types of wearable devices associated with the mobile device and the respective user, (iii) application information identifying installed applications of the set of different types of wearable devices providing the first set of functionality to the respective user, and (iv) configuration information identifying customizable device and/or application configurations of the set of different types of wearable devices providing the first set of functionality to the respective user,
  - store local information including the received user identity information, wearable device information, application information, and configuration information associated with each mobile device,
  - determine, over all mobile devices having a substantially identical combination of user-type and set of different types of wearable devices, an optimal configuration for each combination of user-type and set of different types of wearable devices based on the stored local information; and
  - transmit, to the particular mobile device out of the plurality of mobile devices, a determined optimal configuration, wherein the optimal configuration is based on crowd-sourced data of other mobile devices in the plurality of mobile devices having a substantially identical set of different types of wearable devices and substantially identical identified first type of user as the particular mobile device.

13. The server of claim 12, wherein the memory storing instructions that, when executed, further cause the processor to:
provide an application to one of the plurality of users, wherein the application is configured to operate on a respective one of the mobile device and/or wearable devices associated with the respective user.

14. The server of claim 12, wherein the memory storing instructions that, when executed, further cause the processor to:
continually update the optimal configuration for each of the combinations of user-type and set of different types of wearable devices, based on further application information and configuration information updates received from the mobile devices.

15. The server of claim 12, wherein the memory storing instructions that, when executed, further cause the processor to:
transmit the determined optimal configuration to the particular mobile device responsive to receiving a request from the particular mobile device for the optimal configuration.

16. The server of claim 15, wherein the memory storing instructions that, when executed, further cause the processor to:
cause automatic configuration of the wearable devices associated with the particular mobile device based on the transmitted optimal configuration.

17. The server of claim 12, wherein the stored configuration information and application information received from each of the mobile devices is anonymized with respect to the plurality of respective users associated with the mobile devices.

18. The server of claim 12, wherein the set of different types of wearable devices are sensors capable of providing duplicative sensor functionality, and wherein the optimal configuration includes configuration of the sensors to avoid duplicative sensor functionality.

19. The server of claim 12, wherein the memory storing instructions that, when executed, further cause the processor to:
- compare a particular set of wearable devices associated with a particular mobile device and particular respective user with a second set of different types of wearable devices formed by removal of a particular wearable device from the particular set of different types of wearable devices; and
- automatically adjusting a set of functionality provided by the second set of different types of wearable devices in a second optimal configuration to recover functionality for the particular respective user lost by the removal of the particular wearable device in the second set of different types of wearable devices; and
- transmit the second optimal configuration to the particular mobile device.

20. The server of claim 12, wherein the memory storing instructions that, when executed, further cause the processor to:
- compare a particular set of wearable devices associated with a particular mobile device and particular respective user with a second set of different types of wearable devices formed by addition of a particular wearable device from the particular set of different types of wearable devices; and
- automatically adjusting a set of functionality provided by the second set of different types of wearable devices in a second configuration to avoid duplicative functionality to the particular respective user between the added particular wearable device and the remaining wearable devices in the second set of different types of wearable devices.

21. A mobile device communicatively coupled to a first set of a plurality of different types of wearable devices associated with a first user to provide a first set of functionality to the first user, the mobile device comprising:
- a Wide Area Network (WAN) and/or a Wireless Local Area Network (WLAN) wireless interface communicatively coupled to a network;
- a Personal Area Network (PAN) wireless interface communicatively coupled to the first set of different types of wearable devices;
- a processor communicatively coupled to the PAN wireless interface and the WAN and/or WLAN wireless interface; and
- memory storing instructions that, when executed, cause the processor to
  - form the PAN with the first set of different types of wearable devices via the PAN wireless interface;
  - operate, via the PAN, the first set of different types of wearable devices in an initial application and configuration state to provide the first set of functionality to the first user, the first user being an identified first type of user associated with particular user role; and transmit, via the WAN and/or WLAN wireless interface, data to a wearable device set application and configuration recommendation engine including the identified first type of user of the first user, identities of wearable devices in the first set of different types of wearable devices associated with the first user, application information identifying installed applications of the first set of different types of wearable devices providing the first set of functionality to the first user, and configuration information identifying customizable device and/or application configurations of the first set of different types of wearable devices; and receive, from the wearable device set application and configuration recommendation engine, recommended application information and configuration information, wherein the recommended configuration is based on crowd-sourced data of other mobile devices having a substantially identical set of different types of wearable devices and substantially identical identified first type of user.

* * * * *